(12) United States Patent
Mackovjak et al.

(10) Patent No.: US 7,712,845 B2
(45) Date of Patent: May 11, 2010

(54) METHOD TO REDUCE THE TURN RADIUS OF MOTOR VEHICLES UTILIZING AUTOMATIC SINGLE SIDE REAR BRAKE APPLICATION

(75) Inventors: John M. Mackovjak, Romeo, MI (US); Robert L. Nisonger, Milford, MI (US); Mario B. Kennedy, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 780 days.

(21) Appl. No.: 11/419,012

(22) Filed: May 18, 2006

(65) Prior Publication Data

US 2007/0267916 A1 Nov. 22, 2007

(51) Int. Cl.
*B60T 8/60* (2006.01)
(52) U.S. Cl. .................................... 303/147; 303/148
(58) Field of Classification Search ................. 303/140, 303/146, 147, 148; 701/72
See application file for complete search history.

(56) References Cited

U.S. PATENT DOCUMENTS

| 4,669,559 | A | | 6/1987 | Fukui |
|---|---|---|---|---|
| 5,746,486 | A | * | 5/1998 | Paul et al. .................... 303/146 |
| 5,762,406 | A | * | 6/1998 | Yasui et al. .................. 303/146 |
| 6,035,251 | A | * | 3/2000 | Hac et al. .................... 303/146 |
| 6,212,460 | B1 | * | 4/2001 | Rizzo et al. .................. 303/146 |
| 6,409,287 | B1 | * | 6/2002 | Leach et al. ................. 303/146 |
| 6,896,338 | B2 | | 5/2005 | Nakayasu |
| 2002/0066616 | A1 | * | 6/2002 | Wessman ..................... 180/446 |
| 2003/0030724 | A1 | * | 2/2003 | Okamoto ..................... 340/435 |
| 2004/0046447 | A1 | * | 3/2004 | Wanke et al. ................ 303/140 |
| 2005/0206224 | A1 | * | 9/2005 | Lu .................................. 303/7 |
| 2005/0206225 | A1 | * | 9/2005 | Offerle et al. .................. 303/7 |
| 2005/0206226 | A1 | * | 9/2005 | Lu et al. ........................ 303/20 |
| 2005/0240322 | A1 | * | 10/2005 | Peltz et al. .................... 701/19 |

FOREIGN PATENT DOCUMENTS

| DE | 19717613 A1 | | 2/1998 |
|---|---|---|---|
| EP | 1078831 A2 | | 2/2001 |
| JP | 2006103517 A | * | 4/2006 |

OTHER PUBLICATIONS

"Automotive Stability Enhancement Systems," Surface Vehicle Information Report SAE J2564, Society of Automotive Engineers, Warrendale, PA 15096, 10 pages, revised Jun. 2004, issued Dec. 2000.

* cited by examiner

*Primary Examiner*—Thomas J Williams

(57) ABSTRACT

A method of selective, automatic application of one rear brake of a motor vehicle under appropriate vehicle operating conditions in response to intent of a driver to make a turn, whereby the rotational speed of the selected braked rear wheel is reduced so as to reduce the turn radius of the vehicle. Vehicle sensor outputs and calculated parameters in conjunction with vehicle systems such as, but not limited to, ESC, ABS, and traction control are used to determine if appropriate vehicle operating conditions exist to actuate the present invention. The method of the present invention is implemented via an algorithmic control, preferably within an ESC system.

4 Claims, 3 Drawing Sheets

METHOD TO REDUCE THE TURN RADIUS OF MOTOR VEHICLES UTILIZING AUTOMATIC SINGLE SIDE REAR BRAKE APPLICATION

TECHNICAL FIELD

The present invention relates generally to motor vehicle maneuverability and more specifically to a method of automatically controlling rear braking systems of a motor vehicle to reduce the turn radius.

BACKGROUND OF THE INVENTION

In the farm implements art, most farm tractors have separate left rear and right rear brake pedals, which respectively activate the left rear brake or the right rear brake separately of one another. For example, to make a very tight right turn (i.e., to reduce the turn radius of the tractor for a right turn), manual operation of the right rear brake pedal by the operator activates the right rear brake whereby the rotational speed of the braked right rear wheel is reduced, thereby reducing the turn radius of the braked right rear wheel by which the turn radius of the tractor is reduced, such that the tractor almost pivots about the right rear wheel.

In the automotive art, modern dual-circuit hydraulic braking systems for automotive applications typically include an operator-actuated brake actuation unit, such as a tandem master cylinder actuated by a booster-aided brake pedal, by which to supply a first pressurized fluid to each of a first pair of wheel brakes via a first or "primary" braking circuit, and a second pressurized fluid to each of a second pair of wheel brakes via a second or "secondary" braking circuit. The use of wholly redundant braking circuits for operating discrete pairs of wheel brakes ensures continued vehicle braking capability, notwithstanding a degradation of performance of one of the braking circuits. Alternatively, electric actuation of individual wheel brakes is possible as well by techniques well known in the art.

In order to achieve an "anti-lock" brake system (ABS), each braking circuit often features a normally-open electrically-operated inlet valve controlling the flow of pressurized fluid to each wheel brake, while a pressure relief line that includes a normally-closed electrically-operated outlet valve, a return pump, and a check valve controls the return of pressurized fluid from the wheel brake to the brake line upstream of the inlet valve. A "separation" or "isolation" valve, located in the brake line of each circuit upstream of the location at which the pressure relief line connects to the brake line, serves to isolate the brake line from the master cylinder during anti-lock operation.

Increasingly, such anti-lock brake systems are used in combination with wheel speed sensors in a traction control mode. The further addition of a steering angle sensor, a vehicle yaw rate sensor, and a lateral vehicle acceleration sensor in conjunction with vehicle speed, wheel speed, and wheel longitudinal slip enables such anti-lock brake systems to operate in an "electronic stability control" mode, wherein a braking system controller selectively energizes each circuit's electrically-operated valves when the controller identifies an opportunity to enhance vehicle stability through a selective application of the vehicle's brakes. Alternatively, a braking system controller may selectively energize individual wheel brakes through electric actuation.

In order to control the fluid pressure in traction control or vehicle stability control modes, a hydraulic pump is typically placed in the pressure relief line of each circuit downstream of the outlet valve to return pressurized fluid to the circuit's brake line. The pump also serves to provide an increasing rate of fluid pressure upon the closing of the isolation valve to provide a sufficient braking system response time when operating in a traction control mode, even at a time when the brake fluid has a relatively-high viscosity due, for example, to low brake fluid temperatures.

The prior art has recognized, however, that a quicker system response is desirable when the braking system is operated in a vehicle stability control mode. By way of example, a rapid pressure build up in one or the other braking circuit is particularly desirable upon commencing vehicle stability control in order to correct oversteer or understeer conditions. Accordingly, the prior art teaches the addition of a braking circuit pre-charging function to the brake actuation unit, i.e., to the vacuum booster of the master cylinder, in order to increase system response at the time such vehicle stability control is commenced. Alternatively, an additional pre-charging pump is provided in one or both braking circuits to ensure a sufficient increasing rate of fluid pressure at the commencement of vehicle stability control enhancement.

There are multiple Electronic Stability Control (ESC) system implementations on the road today. Although all of them attempt to perform the same task of helping the driver retain reasonable directional control under nonlinear vehicle dynamic conditions, these ESC systems have some distinct implementation differences and can be divided into four categories as defined and described in The Society of Automotive Engineers (SAE) Surface Vehicle Information Report, SAE J2564, "Automotive Stability Enhancement Systems", revised June, 2004 and superceding version issued December, 2000, which report is hereby incorporated herein by reference in its entirety.

A system is defined as an ESC system in the above referenced report SAE J2564 if it:

a) is computer controlled and the computer contains a closed-loop algorithm designed to limit understeer and oversteer of the vehicle;

b) has a means to determine vehicle yaw velocity and side slip;

c) has a means to monitor driver steering input;

d) has a means of applying and adjusting the vehicle brakes to induce correcting yaw torques to the vehicle; and e) is operational over the full speed range of the vehicle (except below a low-speed threshold where loss of control is unlikely).

Electronic Stability Control systems in use today can be divided into four categories, as follows.

Type A, comprised of two brake force channels used for yaw stability control (YSC) and three brake force channels used for ABS. Three speed sensors are used, one for each front wheel and one for detecting the average of the two rear wheels.

Type B, comprised of two brake force channels for YSC and traction control, four brake force channels for ABS. Four wheel speed sensors are used at each of the four corners (wheels).

Type C, comprised of four brake force channels for ABS, YSC and traction control. Four wheel speed sensors are used at each of the four corners.

Type D, comprised of a type C system with integrated preemptive control strategies and additional control channels that interface to other than the brake subsystem. These subsystems include, but are not limited to active driveline couplings, and active dampers and stabilizer bars and active steering.

For the vast majority of ESC systems, the corrective yaw moments that are developed by generating tire slip using the vehicle's brake corners are typically hydraulically actuated, but may also use electric actuators to generate the required corner brake force by techniques well known in the art.

Elements that all of these ESC systems have in common include ABS and the ability to sense steering wheel position; the ability to calculate vehicle speed; the ability to sense yaw velocity and lateral acceleration; and the ability to build and control braking force in the channels used for yaw stability control independent of the driver's input to the vehicle braking system. An example of the implementation of a vehicle hydraulic braking system utilizing a Type C or Type D ESC system is described in U.S. Pat. No. 6,896,338, which patent is hereby incorporated herein by reference in its entirety.

Returning now to the concept of minimizing turning radii, it is desirable to have minimization of the turning radius of a motor vehicle. Rear wheel steering, incorporated in vehicles with four wheel steering, can provide a small turning radius; however, four wheel steering is costly and requires a large packaging space around the rear wheels.

Accordingly, what is needed in the prior art is a method of automatically reducing the turn radius of motor vehicles which somehow mimics a farm tractor's ability to have a small turn radius via independently applying the brake of the wheel inside the turn radius by somehow adapting this model to an automotive ESC system.

SUMMARY OF THE INVENTION

The present invention is a method of selective automatic application of one rear brake of a motor vehicle actuated under appropriate vehicle operating conditions in response to sensing a turn, the turn being actualized by the vehicle operator whose intent is to make a left or right turn, wherein the motor vehicle incorporates a, preferably, Type C or Type D ESC system.

According to the methodology of the present invention, rotational speed of a selected rear wheel is reduced (within a range of allowed slip) by selective braking so as to reduce the turn radius of the motor vehicle. The selected rear wheel is that wheel which is on the inside of the turn (i.e. the right rear wheel in the case of a right turn). As an example, the present invention may be utilized to assist the operator of the motor vehicle in parking the vehicle. The capability of a Type C or Type D ESC system to apply all four brakes individually is utilized to automatically separately activate the left rear or right rear brake in order to enhance a reduction of the turn radius of motor vehicles equipped therewith.

The method according to present invention utilizes vehicle sensor outputs and calculated parameters available from the vehicle microprocessor or ESC system such as, but not limited to, vehicle speed, wheel speeds, steering wheel angle, steering hydraulic assist pressure, wheel slip, yaw velocity, lateral acceleration, gear position, throttle position, master cylinder brake pressure, wheel brake pressure, brake pedal position, and rate of change of wheel brake pressure. The aforementioned vehicle sensor outputs and calculated parameters are compared to predetermined parameter values obtained empirically or through simulation for a particular vehicle model to determine, in conjunction with vehicle systems such as, but not limited to, ESC, ABS, and traction control, whether appropriate vehicle operating conditions exist to actuate the present invention. The method of the present invention is implemented via an algorithmic control, preferably, by software within the ESC system.

Accordingly, it is an object of the present invention to provide an ESC based independent application of an inside turn rear wheel brake to effect minimization of the turning radius of the motor vehicle.

This and additional objects, features and advantages of the present invention will become clearer from the following specification of a preferred embodiment.

DESCRIPTION OF THE PREFERRED EMBODIMENT

Figure 1:
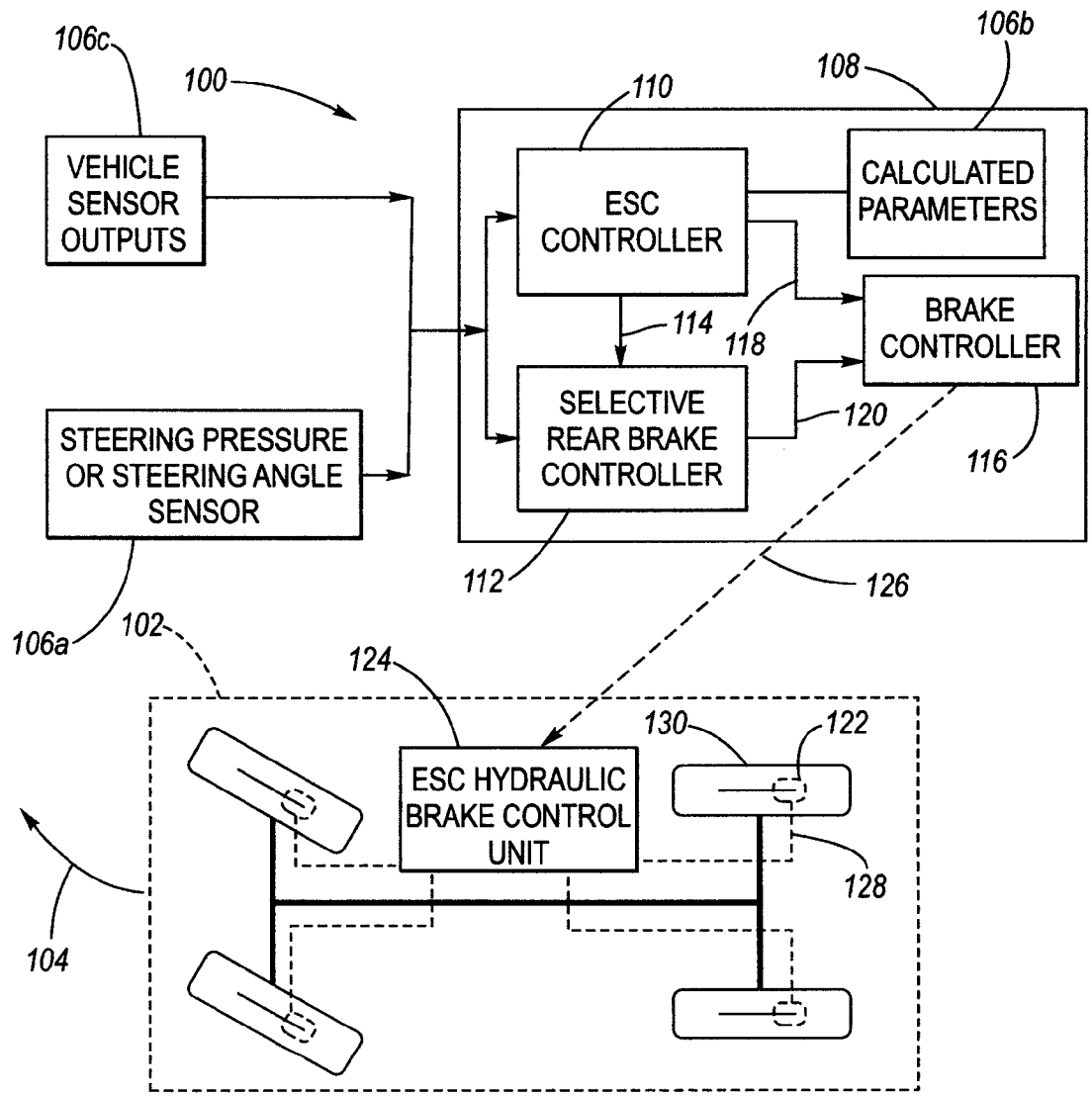
FIG. 1 is an example of a functional pictorial view of a motor vehicle according to the present invention.

FIG. 1 is an example of a functional pictorial view 100 of a motor vehicle 102 implementing the present invention during a right hand turn 104. The vehicle operator's intent to make a right hand turn 104 is sensed (detected) through either a steering wheel angle or steering hydraulic pressure sensor 106a, the output of which being input to the ESC electronic control system 108. Calculated parameters 106b are available to the ESC electronic control system 108 via the ESC controller 110 thereof. Vehicle sensor outputs 106c are input to the ESC electronic control system 108. The calculated parameters 106b and vehicle sensor outputs 106c include, but are not limited to, vehicle speed, wheel speeds, steering wheel angle, steering hydraulic assist pressure, wheel slip, yaw velocity, lateral acceleration, gear position, throttle position, master cylinder brake pressure, wheel brake pressure, brake pedal position, and rate of change of wheel brake pressure The ESC controller 110 of the ESC electronic control system 108 compares the vehicle sensor outputs and calculated parameters to predetermined parameter values obtained empirically or through simulation for a particular vehicle model to determine, in conjunction with vehicle systems such as, but not limited to, ESC, ABS, and traction control, whether vehicle chassis control activity is occurring, as for example a situation in which the operation of the vehicle is unstable. If vehicle chassis control chassis activity is occurring, brake controller 116 is notified via line 118 and selective rear brake controller 112 is notified via line 114.

Otherwise, if vehicle chassis control chassis activity is not occurring, selective rear brake controller 112 is notified via line 114. Selective rear brake controller 112 utilizes vehicle sensor outputs and calculated parameters available from the vehicle microprocessor or ESC system such as, but not limited to, vehicle speed, wheel speeds, steering wheel angle, steering hydraulic assist pressure, wheel slip, yaw velocity, lateral acceleration, gear position, throttle position, master cylinder brake pressure, wheel brake pressure, brake pedal position, and rate of change of wheel brake pressure. The selective rear brake controller 112 utilizes the aforementioned vehicle sensor outputs and calculated parameters in conjunction with predetermined parameter values obtained empirically or through simulation for a particular vehicle model to determine, in conjunction with vehicle systems such as, but not limited to, ESC, ABS, and traction control, whether appropriate vehicle operating conditions exist to actuate the present invention. If appropriate vehicle operating conditions do exist to actuate the present invention, then selective rear brake controller 112 determines appropriate rear brake parameters and selects the appropriate rear brake (the wheel at the inside of the turn) to activate (the rear right brake 122 of the rear right wheel 130 in the example of FIG. 1), whereby brake controller 116 is notified via line 120.

Brake controller 116 directs ESC hydraulic brake control unit 124 via line 126 to activate the appropriate rear brake (the rear right brake 122 in the example of FIG. 1) via brake hydraulic line 128, whereby the rotational speed of the selected braked rear wheel (130 in FIG. 1) is selectively reduced, whereupon the right turn radius of the vehicle 102 is reduced. The selected braked rear wheel is that wheel which is on the inside of the turn (i.e., the right rear wheel 130 in the case of a right turn).

During and after activation of the appropriate rear brake (128 in FIG. 1), selective rear brake controller 112 continuously monitors whether appropriate vehicle operating conditions continue to exist to actuate the present invention, as described hereinabove. If appropriate vehicle operating conditions continue to exist to actuate the present invention, selective rear brake controller 112 functions as previously described hereinabove. Otherwise, if appropriate vehicle operating conditions do not continue to exist to actuate the present invention, as described hereinabove, selective rear brake controller 112 notifies brake controller 116 via line 120 to deactivate the presently activated rear brake utilizing appropriate brake parameters.

Figure 2:
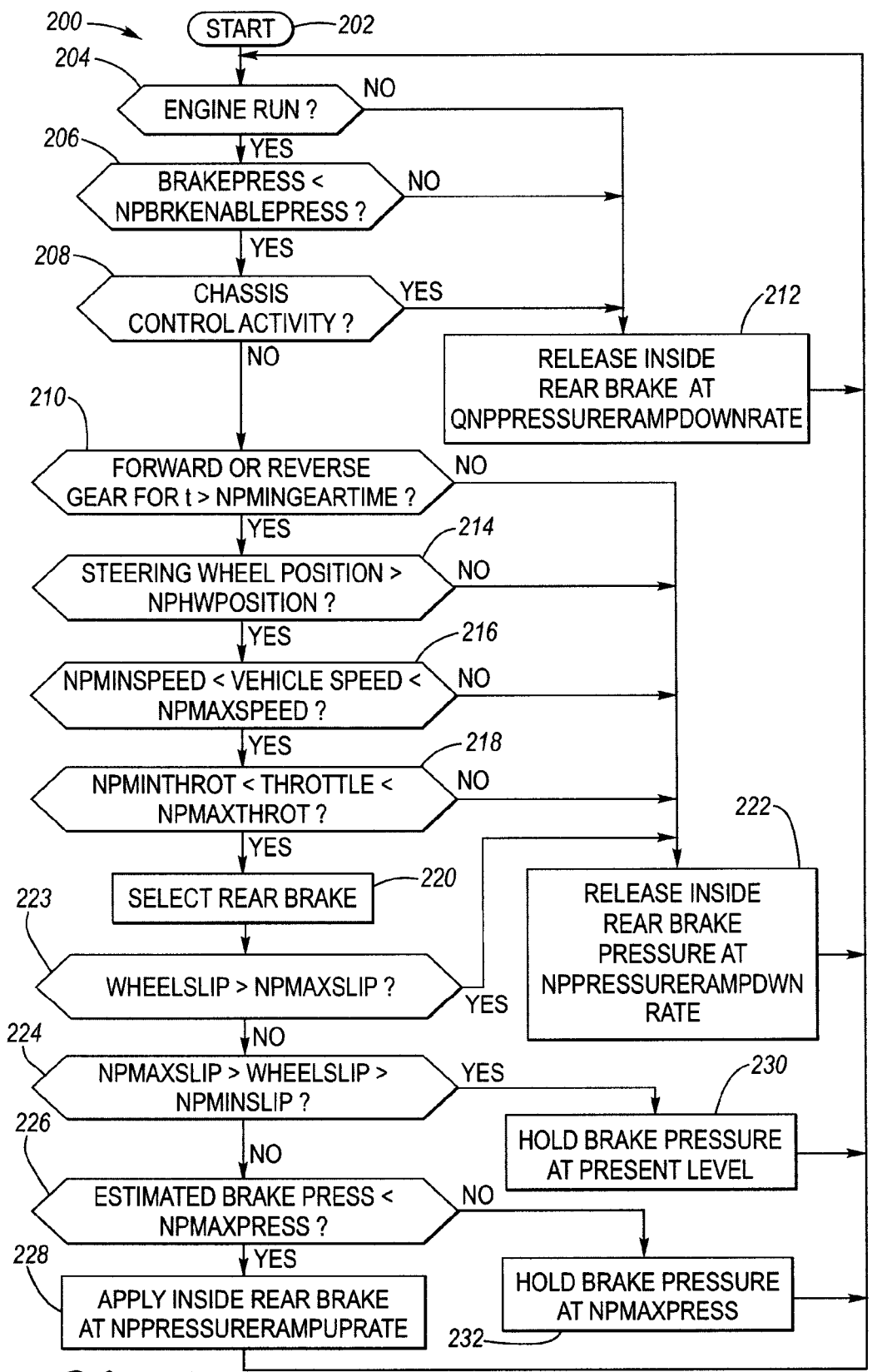
FIG. 2 is an example of an algorithmic method to implement the present invention.

FIG. 2 is an example of an algorithmic method 200 to implement the present invention. The predetermined parameter values obtained empirically or through simulation for a particular vehicle model utilized in FIG. 2 are presented in Table I.

TABLE I

| Parameter Name | Function | Range |
|---|---|---|
| NPMINGEARTIME | Continuous time in a forward or reverse gear | 1 to 5 seconds |
| NPHWPOSITION | Steering wheel position | Greater than 95% to 98% of the maximum steering wheel angular position |
| NPMINSPEED | Lowest vehicle speed | 1 to 3 miles/hour |
| NPMAXSPEED | Highest vehicle speed | 4 to 8 miles/hour |
| NPMINTHROT | Lowest accelerator pedal position | 0 to 5% |
| NPMAXTHROT | Highest accelerator pedal position | 25% to 40% |
| NPMAXPRESS | Maximum applied brake pressure of activated rear brake | 200 psi to 1000 psi |
| NPPRESSURERAMPUPRATE | Rate of change of brake pressure increase of activated rear brake | 50 psi/sec to 800 psi/sec |
| NPPRESSURERAMPDOWNRATE | Rate of change of brake pressure decrease of activated rear brake | 50 psi/sec to 800 psi/sec |

TABLE I-continued

| Parameter Name | Function | Range |
|---|---|---|
| QNPPRESSURERAMPDOWNRATE | Quick brake pressure release of activated rear brake | Greater than 2000 psi/sec |
| NPBRKENABLEPRESS | Maximum allowable brake pedal induced master brake cylinder pressure | 150 psi to 400 psi |
| NPMAXSLIP | Maximum wheel slip of selected rear wheel | 15% to 70% |
| NPMINSLIP | Minimum wheel slip of selected rear wheel | 1% to 10% |

The algorithm is initiated at Block 202 and proceeds to Block 204. If the engine is running at Block 204, control passes to Block 206. If the brake pedal induced master brake cylinder pressure at Block 206 is less than NPBRKENABLEPRESS, control passes to Block 208. If there is no chassis control activity, as determined by, for example, the ESC, ABS, or traction control systems, control passes to Block 210. In the case where the engine is not running at Block 204 or the brake pedal induced master brake cylinder pressure at Block 206 is greater than NPBRKENABLEPRESS or a chassis control activity at Block 208 is occurring wherein an electronic control (i.e., ESC, ABS, or traction control systems) of the motor vehicle is sensing a tracking instability for which the electronic control provides a pre-programmed stability control response, control is passed to Block 212. At Block 212, the inside rear brake is released at QNPPRESSURERAMP-DOWNRATE and control then passes to Block 204.

At Block 210, if the time in a forward or reverse gear is greater than NPMINGEARTIME, control passes to Block 214. At Block 214, if the steering wheel position is greater than NPHWPOSITION, control passes to Block 216. At Block 216, if the vehicle speed is between NPMINSPEED and NPMAXSPEED, control passes to Block 218. At Block 218, if the throttle position is between NPMINTHROT and NPMAXTHROT, control passes to Block 220.

However, if at Block 210 the time in a forward or reverse gear is less than NPMINGEARTIME or at Block 214 the steering wheel position is less than NPHWPOSITION or at Block 216 the vehicle speed is not between NPMINSPEED and NPMAXSPEED or at Block 218 the throttle position is not between NPMINTHROT and NPMAXTHROT, control passes to Block 222. At Block 222, the inside rear brake is released at NPPRESSURE-RAMPDOWNRATE and control then passes to Block 204.

At Block 220, the appropriate rear wheel to brake, the inside rear wheel of the turn, is selected using, for example, steering wheel angle position, and control passes to Block 223.

At Block 223, if the wheel slip of the selected rear wheel to brake is greater than NPMAXSLIP, then control passes to Block 222 whereat the inside rear brake is released at NPPRESSURE-RAMPDOWNRATE and control then passes to Block 204; if not, control passes to Block 224. In this regard, "wheel slip" of a wheel during vehicle movement ranges between 100 percent when the wheel is locked (non-rotating) and zero percent when the wheel is freely rotating, and is defined by the expression: (wheel free rotation speed minus actual wheel rotation speed) divided by wheel free rotation speed.

At Block 224, if the wheel slip of the selected rear wheel to brake is not between NPMINSLIP and NPMAXSLIP, then control passes to Block 226.

At Block 226, if the estimated brake pressure is less than NPMAXPRESS, control passes to Block 228. At Block 228, the brake of the selected rear wheel is applied at NPPRESSURERAMPUPRATE. The estimated brake pressure and wheel slip of the selected rear wheel to brake are calculated by the ESC control system. The ESC control system uses the master brake cylinder pressure sensor, valve control information, and wheel speed sensors to continuously estimate these parameters.

At Block 224, if the wheel slip of the selected rear wheel to brake is between NPMINSLIP and NPMAXSLIP, control passes to Block 230 whereat the brake pressure of the selected rear wheel to brake is held at its present level and control then passes to Block 204. At Block 226, if the estimated brake pressure is greater than NPMAXPRESS, control passes to Block 232 whereat the brake pressure of the selected rear wheel to brake is held at NPMAXPRESS and control then passes to Block 204.

Figure 3:
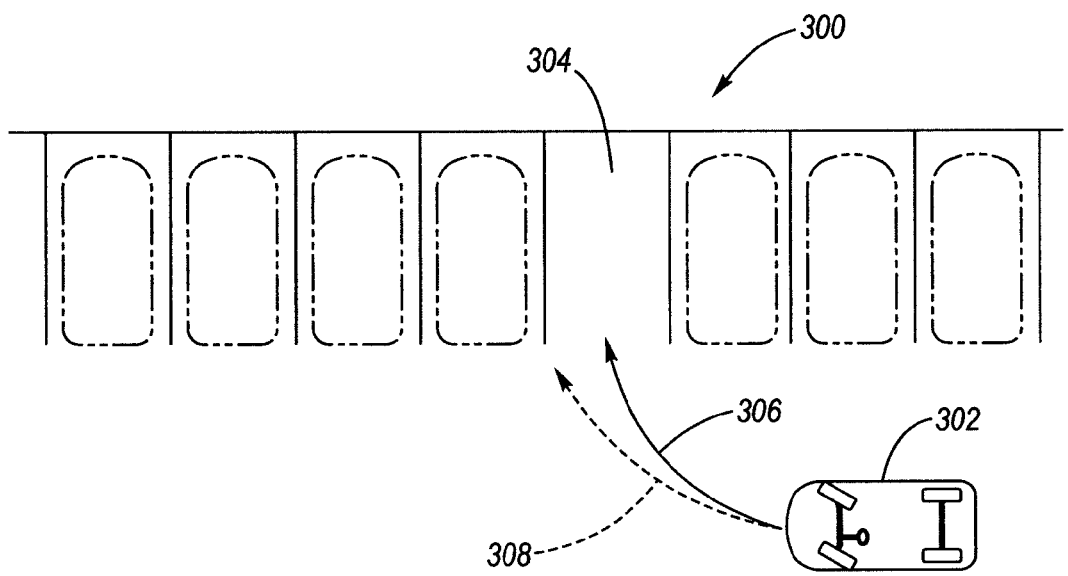
FIG. 3 is a pictorial view of an implementation of a first parking example according to the present invention.

FIG. 3 is a pictorial view of an implementation of a first parking example 300 according to the present invention. In FIG. 3, a motor vehicle 302 is shown pulling forward into a parking place 304. The method according to the present invention shortens the turn radius of the vehicle 302 depicted by solid line curved path 306 as compared to a conventional turn radius depicted by dashed line curved path 308 which otherwise would be traversed by the vehicle.

Figure 4:
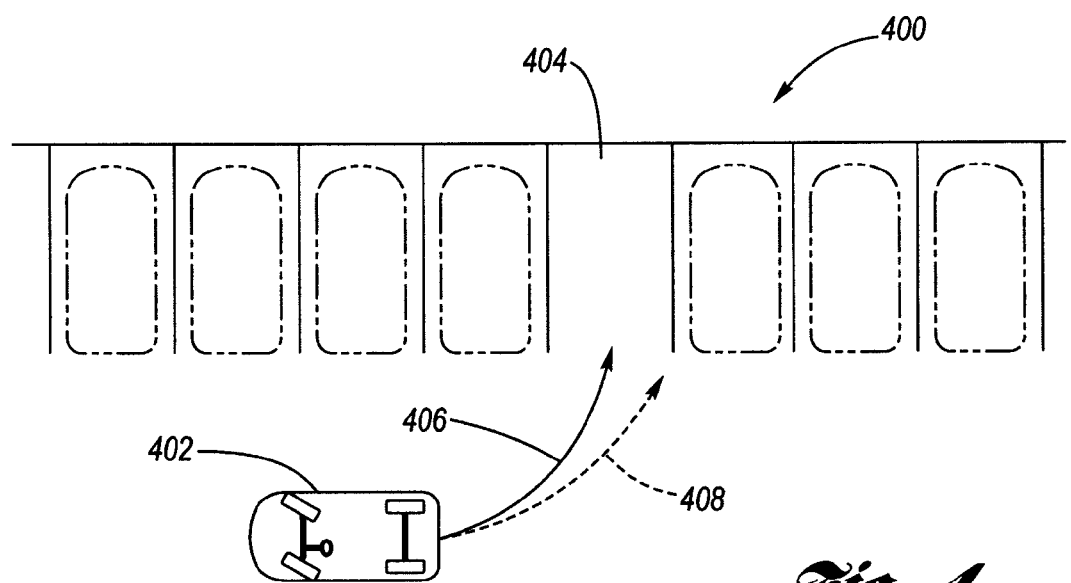
FIG. 4 is a pictorial view of an implementation of a second parking example according to the present invention.

FIG. 4 is a pictorial view of an implementation of a second parking example 400 according to the present invention. In FIG. 4, a motor vehicle 402 is shown backing into a parking place 404. The method according to the present invention shortens the turn radius of the vehicle 402 depicted by solid line curved path 406 as compared to a conventional turn radius depicted by dashed line curved path 408 which otherwise would be traversed by the vehicle.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for reducing motor vehicle turning radii, said method comprising the steps of:
    sensing a turn of a motor vehicle;
    determining which rear wheel of the motor vehicle is an inside rear wheel of the turn; and
    selectively applying a brake of the inside rear wheel in automatic response to said step of sensing to thereby effect a reduction in turning radius of the turn of the motor vehicle;
    wherein said step of selectively applying the brake comprises:
        determining wheel slip of the inside rear wheel;
        determining preselected operating conditions of the motor vehicle; and
        applying the brake only if the determined preselected operating conditions are within preselected ranges, wherein the applying of the brake comprises applying brake pressure to the brake within a predetermined brake pressure range so that the wheel slip is within a predetermined wheel slip range;
    wherein the determining of preselected operating conditions of the motor vehicle comprises:
        determining that a brake pedal pressure is less than a predetermined pressure;
        determining that chassis control activity is absent;
        determining that the engine of the motor vehicle is running;
        determining that the time in a selected gear is greater than a predetermined gear time;
        determining that the steering wheel of the motor vehicle has an angular position exceeding a predetermined steering wheel angular position;
        determining that speed of the motor vehicle is within a predetermined range of vehicle speed; and
        determining that position of a throttle of the motor vehicle is within a predetermined throttle range.

2. The method of claim 1, wherein said chassis control activity comprises:
    an electronic control of the motor vehicle sensing a tracking instability for which the electronic control provides a pre-programmed stability control response.

3. A method for reducing motor vehicle turning radii, said method comprising the steps of:
    sensing a turn of a motor vehicle determining which rear wheel of the motor vehicle is an inside rear wheel of the turn;
    determining that chassis control activity is absent
    determining preselected operating conditions of the motor vehicle; and
    selectively applying a brake of the inside rear wheel in automatic response to said steps of sensing and determining to thereby effect a reduction in turning radius of the turn of the motor vehicle;
    wherein the determining of preselected operating conditions of the motor vehicle comprises:
        determining that a brake pedal pressure is less than a predetermined pressure;
        determining that the engine of the motor vehicle is running;
        determining that the time in a selected gear is greater than a predetermined gear time;
        determining that the steering wheel of the motor vehicle has an angular position exceeding a predetermined steering wheel angular position;
        determining wheel slip of the inside rear wheel;
        determining that speed of the motor vehicle is within a predetermined range of vehicle speed; and
        determining that position of a throttle of the motor vehicle is within a predetermined throttle range;
    wherein said step of sensing comprises sensing a turn of the motor vehicle in which a steering wheel of the motor vehicle has been rotated to an angular position that is above substantially 95 percent of a maximum angular position thereof; and
    wherein the applying of the brake comprises applying brake pressure to the brake within a predetermined brake pressure range so that the wheel slip is within a slip range of substantially between 1 percent and 70 percent.

4. The method of claim 3, wherein said chassis control activity comprises:
    an electronic control of the motor vehicle sensing a tracking instability for which the electronic control provides a pre-programmed stability control response.

* * * * *